(12) United States Patent
Ajisaka

(10) Patent No.: US 8,752,660 B2
(45) Date of Patent: Jun. 17, 2014

(54) COOLING STRUCTURE FOR VEHICLES

(75) Inventor: Satoshi Ajisaka, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/813,579

(22) PCT Filed: Aug. 3, 2010

(86) PCT No.: PCT/JP2010/063123
§ 371 (c)(1),
(2), (4) Date: Jan. 31, 2013

(87) PCT Pub. No.: WO2012/017521
PCT Pub. Date: Feb. 9, 2012

(65) Prior Publication Data
US 2013/0133963 A1 May 30, 2013

(51) Int. Cl.
*B60K 11/06* (2006.01)
*B60K 11/00* (2006.01)
*B60K 11/08* (2006.01)
*B60R 16/04* (2006.01)

(52) U.S. Cl.
CPC .............. *B60K 11/06* (2013.01); *B60K 11/00* (2013.01); *B60K 11/08* (2013.01); *B60R 16/04* (2013.01)
USPC ......... 180/68.1; 180/298; 180/299; 180/68.4; 180/68.6; 180/68.2; 180/69.1; 180/291; 180/311; 296/203.04; 280/124.109; 280/788; 280/830; 454/148

(58) Field of Classification Search
USPC ........... 180/298, 299, 68.2, 69.1; 296/203.04; 454/148
See application file for complete search history.

(56) References Cited

U.S. PATENT DOCUMENTS

| | | | | |
|---|---|---|---|---|
| 5,673,747 A * | 10/1997 | Kousaka et al. | ................. | 165/41 |
| 6,390,217 B1 * | 5/2002 | O'Brien et al. | ............. | 180/68.6 |
| 7,290,630 B2 * | 11/2007 | Maeda et al. | ................ | 180/68.4 |
| 7,497,287 B2 * | 3/2009 | Kunikata et al. | ............ | 180/68.1 |
| 7,644,793 B2 * | 1/2010 | Iwasaki et al. | ............... | 180/68.2 |
| 2003/0121638 A1 * | 7/2003 | Molari et al. | ................... | 165/41 |
| 2005/0029027 A1 * | 2/2005 | Kunikata et al. | ............. | 180/68.1 |
| 2006/0254838 A1 * | 11/2006 | Ino et al. | ...................... | 180/68.1 |
| 2007/0018038 A1 * | 1/2007 | Jarmon et al. | .................. | 244/59 |

(Continued)

FOREIGN PATENT DOCUMENTS

| | | |
|---|---|---|
| EP | 1728668 B1 * | 11/2012 |
| JP | 60-151723 U | 10/1985 |

(Continued)

*Primary Examiner* — J. Allen Shriver, II
*Assistant Examiner* — Hilary L Johns
(74) *Attorney, Agent, or Firm* — Kenyon & Kenyon LLP

(57) ABSTRACT

There is obtained a cooling structure for a vehicle that can keep low a temperature of an interior of a power unit chamber in which a power unit is disposed. A cooling structure for a vehicle has: a power unit that is disposed within a power unit chamber disposed at a vehicle front side and at which air intake ports are formed in a front end side in a vehicle front-rear direction; an air-cooling-type heat exchanger that is disposed at a rear side with respect to the power unit, and that is cooled by heat exchange with air that passes from a front side to a rear side; and a communication duct that communicates a rear side portion with respect to the air-cooling-type heat exchanger and a rear side portion of the power unit in the power unit chamber.

7 Claims, 4 Drawing Sheets

(56) References Cited

U.S. PATENT DOCUMENTS

| | | |
|---|---|---|
| 2007/0034739 A1* | 2/2007 | Yoeli .......................... 244/23 R |
| 2008/0023173 A1* | 1/2008 | Savage .......................... 165/41 |
| 2009/0283346 A1* | 11/2009 | Katae et al. .................. 180/68.2 |
| 2010/0193174 A1* | 8/2010 | Nemoto ........................ 165/202 |
| 2011/0284298 A1 | 11/2011 | Ajisaka |
| 2012/0153681 A1 | 6/2012 | Ajisaka |

FOREIGN PATENT DOCUMENTS

| | | |
|---|---|---|
| JP | 2-103819 A | 8/1990 |
| JP | 4-79724 U | 7/1992 |
| JP | 9-226388 A | 9/1997 |
| JP | 2006-168631 A | 6/2006 |
| JP | 2007-069651 A | 3/2007 |
| JP | 2011-051482 A | 3/2011 |
| JP | 5018961 B2 | 9/2012 |

\* cited by examiner

COOLING STRUCTURE FOR VEHICLES

This is a 371 national phase application of PCT/JP2010/063123 filed 3 Aug. 2010, the contents of which are incorporated herein by reference.

TECHNICAL FIELD

The present invention relates to a cooling structure for a vehicle, for cooling a power unit space.

RELATED ART

Structures in which a radiator is disposed in front of an engine are known. (Refer to, for example, Japanese Patent Application Laid-Open No. 2007-069651.)

DISCLOSURE OF INVENTION

Technical Subject

However, in a technique such as described above, air after being heated at a radiator is guided to the periphery of an engine within an engine room, and it is easy for the interior of the engine room to become high temperature.

An object of the present invention is to obtain a cooling structure for a vehicle that can keep low the temperature of an interior of a power unit chamber in which a power unit is disposed.

Solution to Subject

A cooling structure for a vehicle relating to a first aspect of the present invention comprises: a power unit that is disposed within a power unit chamber that is disposed at a front side in a front-rear direction of a vehicle and at which air intake ports are formed at a front end side in the vehicle front-rear direction, the power unit generating driving force for the vehicle to travel; a body to be cooled that is disposed at a rear side in the vehicle front-rear direction with respect to the power unit, and that is cooled by heat exchange with air; a fan that is disposed at a rear side in the vehicle front-rear direction from the body to be cooled, and that, by operating, generates a flow of air that passes through from a front side toward a rear side of the body to be cooled in the vehicle front-rear direction, and a communication structure that communicates a space in the vehicle front-rear direction between the fan and the body to be cooled, and a rear side portion in the vehicle front-rear direction from the power unit in the power unit chamber.

In accordance with the above-described aspect, because the body to be cooled is disposed at the rear of the power unit, air, that has not carried out heat exchange with the body to be cooled, is taken-in through the air intake ports into the power unit chamber (the periphery of the power unit). This air exchanges heat with the various types of parts and the like within the power unit chamber, and is discharged through the communication structure from the power unit chamber as hot air. Namely, an air flow (hereinafter called first air flow), that passes through the power unit chamber from the front of the power unit toward the rear, is generated. Due to this first air flow, outside air is introduced while hot air is discharged, and therefore, the temperature of the interior of the power unit chamber can be kept low. Further, this first air flow passes through the communication structure, and is guided to the downstream side of an air flow (hereinafter called second air flow) from the body to be cooled. The second air flow is supplied for cooling the body to be cooled, and is discharged to the exterior of the vehicle together with the first air flow. Namely, it is prevented or reliably suppressed that the first air flow affecting the cooling of the body to be cooled by the second air flow.

Further, when the fan operates, the above-described first air flow and second air flow are both generated. The first air flow is taken-in from the air intake ports, and goes through the power unit chamber and the communication structure, and passes through the fan. The second air flow cools the body to be cooled, and passes through the fan. The first air flow that has contacted the power unit passes through the communication structure, that communicates with the power unit chamber at the rear side of the power unit, and merges with the second air flow between the body to be cooled and the fan, and passes through the fan together with the second air flow. Due thereto, the first and second air flows are generated by a single fan, and the respective functions of discharging hot air of the power unit chamber and cooling the body to be cooled can be achieved.

In this way, in the cooling structure for a vehicle of the above-described aspect, the temperature of the interior of the power unit chamber, in which the power unit is disposed, can be kept low.

The above-described aspect may be structured so as to further comprise: an under cover that covers the power unit chamber from a road surface side, and that has an opening portion that opens to the road surface side at a front side in the vehicle front-rear direction from the body to be cooled; and a duct that covers, from the power unit chamber side, a flow path of air that is guided from the opening portion to the body to be cooled.

In accordance with the above-described aspect, when the fan operates, the above-described first air flow and second air flow are both generated. The first air flow is taken-in from the air intake ports, and goes through the power unit chamber, that is covered from beneath by the under cover, and the communication structure, and passes through the fan. The second air flow is introduced into the duct from the opening portion of the under cover, and cools the body to be cooled, and passes through the fan. The first air flow that has contacted the power unit passes through the communication structure, that communicates with the power unit chamber at the rear side of the power unit, and merges with the second air flow between the body to be cooled and the fan, and passes through the fan together with the second air flow. Due thereto, the first and second air flows are generated by a single fan, and the respective functions of discharging hot air of the power unit chamber and cooling the body to be cooled can be achieved.

The above-described aspect may be structured so as to further comprise a closing member that closes the communication structure when the fan is not operating.

In accordance with the above-described aspect, when, for example, the fan is not operating for the warm-up operation or the like, the communication structure is closed by the closing member. Due thereto, when the fan is not operating, it is suppressed that the heat in the power unit chamber is discharged through the communication structure together with air.

In the above-described aspect, the closing member may be formed so as to be held at a closing position of the communication structure by a closing structure at times of non-operation of the fan, and so as to, accompanying operation of the fan, be moved by aerodynamic force from the closing position to an opening position of the communication structure.

In accordance with the above-described aspect, by causing the fan to operate, air force (wind pressure, negative pressure) is generated, and, due to this air force, the closing member is moved from the closing position to the opening position of the communication structure, against the closing force of the closing structure.

The above-described aspect may be structured such that the communication structure is provided integrally with a shroud to which the body to be cooled and the fan are assembled and that covers the space between the body to be cooled and the fan.

In accordance with the above-described aspect, the body to be cooled, the fan, the shroud, and the communication structure can be handled integrally. By making the shroud and the communication structure integral, a reduction in the number of parts is devised.

The above-described aspect may be structured such that the body to be cooled includes a radiator that, by heat exchange with air, cools a refrigerant that circulates between the radiator and the power unit.

In accordance with the above-described aspect, the power unit is cooled (air-cooled) directly by outside air that is introduced into the power unit chamber, and is indirectly cooled (water-cooled) via the refrigerant that circulates between the power unit and the radiator. Therefore, the cooling efficiency of the power unit is high.

Advantageous Effects of Invention

As described above, the cooling structure for a vehicle relating to the present invention has the excellent effect that the temperature of the interior of a power unit chamber, in which a power unit is disposed, can be kept low.

BEST MODES FOR CARRYING OUT THE INVENTION

Figure 1:
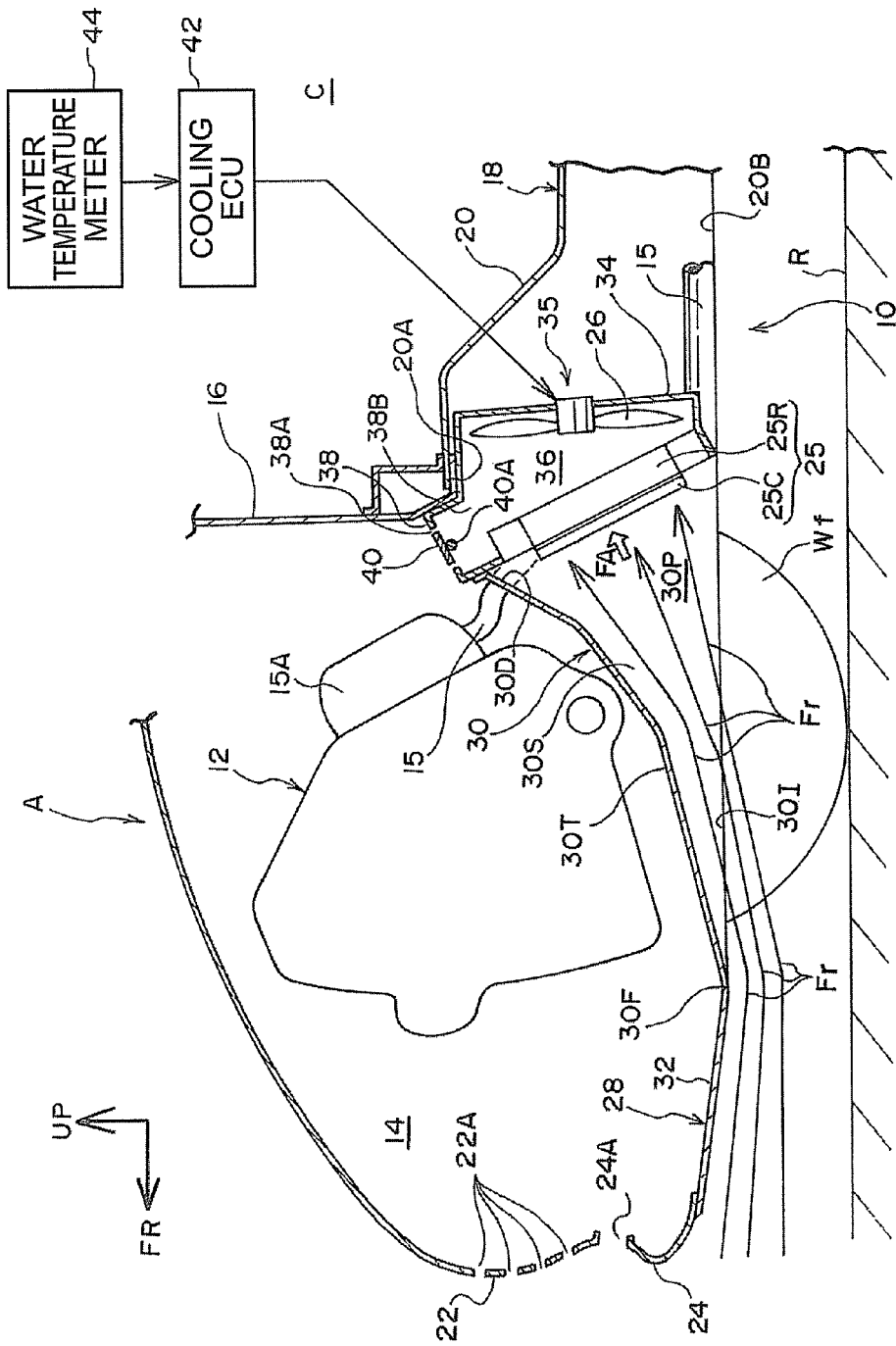
FIG. 1 is a side sectional view showing a cooling structure for a vehicle relating to an embodiment of the present invention.

A cooling structure 10 for a vehicle relating to an embodiment of the present invention is described on the basis of FIG. 1 through FIG. 4. First, the front portion structure of an automobile A to which the cooling structure 10 for a vehicle is applied is described, and next, the concrete structure of the cooling structure 10 for a vehicle is described. Note that arrow FR shown appropriately in the drawings indicates the forward direction in the vehicle front-rear direction, arrow UP indicates the upward direction in the vehicle vertical direction, and arrow W indicates the vehicle width direction, respectively. In the following description, unless otherwise noted, when front-rear and vertical directions are used, they indicate front-rear of the vehicle front-rear direction and vertical of the vehicle vertical direction.

(Schematic Structure of Automobile Front Portion)

The front portion of the automobile A to which the cooling structure 10 for a vehicle applied is shown in FIG. 1 in a schematic side sectional view. As shown in this drawing, a power unit chamber 14, in which a power unit 12 is disposed, is provided at the front end side of the automobile A. The power unit 12 in this embodiment is structured to include an engine, that is an internal combustion engine, and an electric motor as drive sources for driving front wheels Wf respectively. Accordingly, the automobile A is a hybrid automobile that has two drive sources.

Concretely, the power unit is structured with an engine, that is disposed laterally and has a crank shaft that runs along the vehicle width direction, and a transaxle, that is connected to the engine so as to be able to transmit power, as the main portions. The transaxle is structured to include an electric motor, and an unillustrated generator, power dividing mechanism, transmission that is a continuously variable transmission or the like, and the like. Further, in this embodiment, the transaxle is structured to include, for example, an electric motor, a generator, and an inverter that is electrically connected to a battery. Accordingly, the power unit relating to this embodiment can also be interpreted as a power plant.

The power unit chamber 14, in which is disposed the power unit 12 that is structured to include an internal combustion engine as described above, can be interpreted as a so-called engine room. An exhaust pipe 15, that is connected to the engine of the power unit 12 via an exhaust manifold 15A (that may be structured to include a catalytic converter), is passed through a vehicle width direction outer side of a duct 30 that is described later, and, from the rear side of a cooling unit 35, passes through the interior of a floor tunnel 20 and reaches the vehicle rear.

The rear end portion of the power unit chamber 14 is defined by a dash panel 16 that separates the power unit chamber 14 and a vehicle cabin C. The dash panel 16 is joined to the front end portion of a floor panel 18. The floor tunnel 20, that forms a "C" shape that opens downward as seen in a front sectional view, is formed at the central portion in the vehicle width direction at the floor panel 18.

On the other hand, the front end portion of the power unit chamber 14 is defined by a grill 22 and a front bumper (bumper cover) 24. Air intake ports 22A, 24A, for taking air into the interior of the power unit chamber 14, are formed in the grill 22 and the front bumper 24, respectively. The air intake ports 22A, 24A open toward the front of the vehicle.

Further, in the automobile A to which the cooling structure 10 for a vehicle is applied, an air-cooling-type heat exchanger 25 that serves as a body to be cooled is provided so as to close-off an opening end 20A at the front side of the floor tunnel 20. Accordingly, in this embodiment, the air-cooling-type heat exchanger 25 is disposed at the rear side with respect to the power unit 12. The air-cooling-type heat exchanger 25 is structured to include at least one of a radiator and a condenser. The radiator circulates cooling water serving as a refrigerant between the radiator and (the engine and the electric motor of) the water-cooled-type power unit 12 and cools the power unit 12, and the condenser is an air-cooling-type heat exchanger that structures the refrigeration cycle of an unillustrated air conditioner. In this embodiment, the air-cooling-type heat exchanger 25 is structured to include both a radiator 25R and a condenser 25C.

Further, a fan 26 is provided at the rear side of the air-cooling-type heat exchanger 25. Due to operation of the fan 26, the fan 26 generates an air flow (cooling wind) that passes through (an air side flow path of) the air-cooling-type heat exchanger 25. Namely, due to operation of the fan 26, cooling wind that carries out heat exchange with cooling water passes through the air-cooling-type heat exchanger 25 from the vehicle front toward the rear. The cooling wind after carrying out heat exchange with the cooling water is discharged through a downwardly-facing opening end 20B of the floor tunnel 20 to beneath the floor.

The cooling structure 10 for a vehicle that is for guiding cooling wind to the air-cooling-type heat exchanger 25 is described in detail hereinafter. The cooling wind carries out heat exchange with the refrigerant (the cooling water circulating through the radiator 25R, the air conditioning refrigerant circulating through the condenser 25C).

(Structure of Cooling Structure for Vehicle)

As shown in FIG. 1, the cooling structure 10 for a vehicle has an under cover 28 that covers the power unit chamber 14 from the lower side. The duct 30 that is for guiding traveling wind to the air-cooling-type heat exchanger 25 (the interior of the floor tunnel 20) is formed at the under cover 28. The traveling wind flows between the under cover 28 and a road surface R. In this embodiment, the entire under cover 28 including the duct 30 is formed integrally of a resin material.

An opening portion, that opens at the front with respect to the floor tunnel 20 and downward (toward the road surface R side), is formed in the under cover 28 as an introduction port 30I of air into the duct 30. On the other hand, the rear end of the duct 30 is made to be a guide-out port 30D that opens rearward. The space at the interior of the duct 30 between the introduction port 30I and the guide-out port 30D is made to be a flow path 30P that is surrounded by a pair of left and right side walls 30S, that face one another in the vehicle width direction, and a ceiling wall 30T, that connects upper edges in the vehicle vertical direction of the pair of side walls 30S.

Note that the introduction port 30I is open between the left and right front wheels Wf, and, although not illustrated, is formed at the vehicle width direction central portion of the under cover 28 so as to be a substantially equal width as the floor tunnel 20 or so as to have a slightly wider width than the floor tunnel 20. Accordingly, the duct 30 is structured so as to guide air, that is introduced-in from the introduction port 30I, such that the air goes along the front-rear direction (substantially rectilinearly) toward the guide-out port 30D.

Moreover, in this embodiment, a Venturi wall 32 serving as an inclined wall is formed at the front side of the duct 30 at the under cover 28. The Venturi wall 32 is formed by causing the front side portion, in the vehicle front-rear direction, with respect to a front edge portion 30F of the duct 30 (the introduction port 30I) at the under cover 28 to be inclined such that the rear end side is closer to the road surface R than the front end side in the vehicle front-rear direction. It suffices for the Venturi wall 32 to be formed, in the vehicle width direction, at the front side in the vehicle front-rear direction of at least the range at which the duct 30 is set. However, in this embodiment, the front portion of the under cover 28 is made to be, over substantially the entire width in the vehicle width direction, the Venturi wall 32 that is an inclined wall.

This Venturi wall 32 is a structure that makes a space, that is formed between the Venturi wall 32 and the road surface R, be a Venturi shape in which the vertical length narrows (the cross-section of the flow path is throttled) toward the vehicle rear end side. In this embodiment, the portion at this space formed between the Venturi wall 32 and the road surface R that is substantially directly beneath the front edge portion 30F of the duct 30 in the vehicle vertical direction is made to be a neck portion at which the cross-section of the flow path is throttled the most. The cooling structure 10 for a vehicle that has the Venturi wall 32 is structured such that the traveling wind that is heading toward the vehicle rear is guided toward the vehicle upper side as cooling wind Fr due to the Venturi effect of the Venturi wall 32 that arises at the vehicle front side from the introduction port 30I.

The above-described air-cooling-type heat exchanger 25 is interposed between the front side opening end 20A of the floor tunnel 20 and the guide-out port 30D of the duct 30. In this embodiment, the air-cooling-type heat exchanger 25 and the fan 26 are made integral by a shroud 34 and structure the cooling unit 35. As shown in FIG. 1, the air-cooling-type heat exchanger 25 and the fan 26 are disposed so as to be separated in a front-rear direction, and the shroud 34 covers a flow path 36 that is a space formed between the air-cooling-type heat exchanger 25 and the fan 26.

Figure 2:
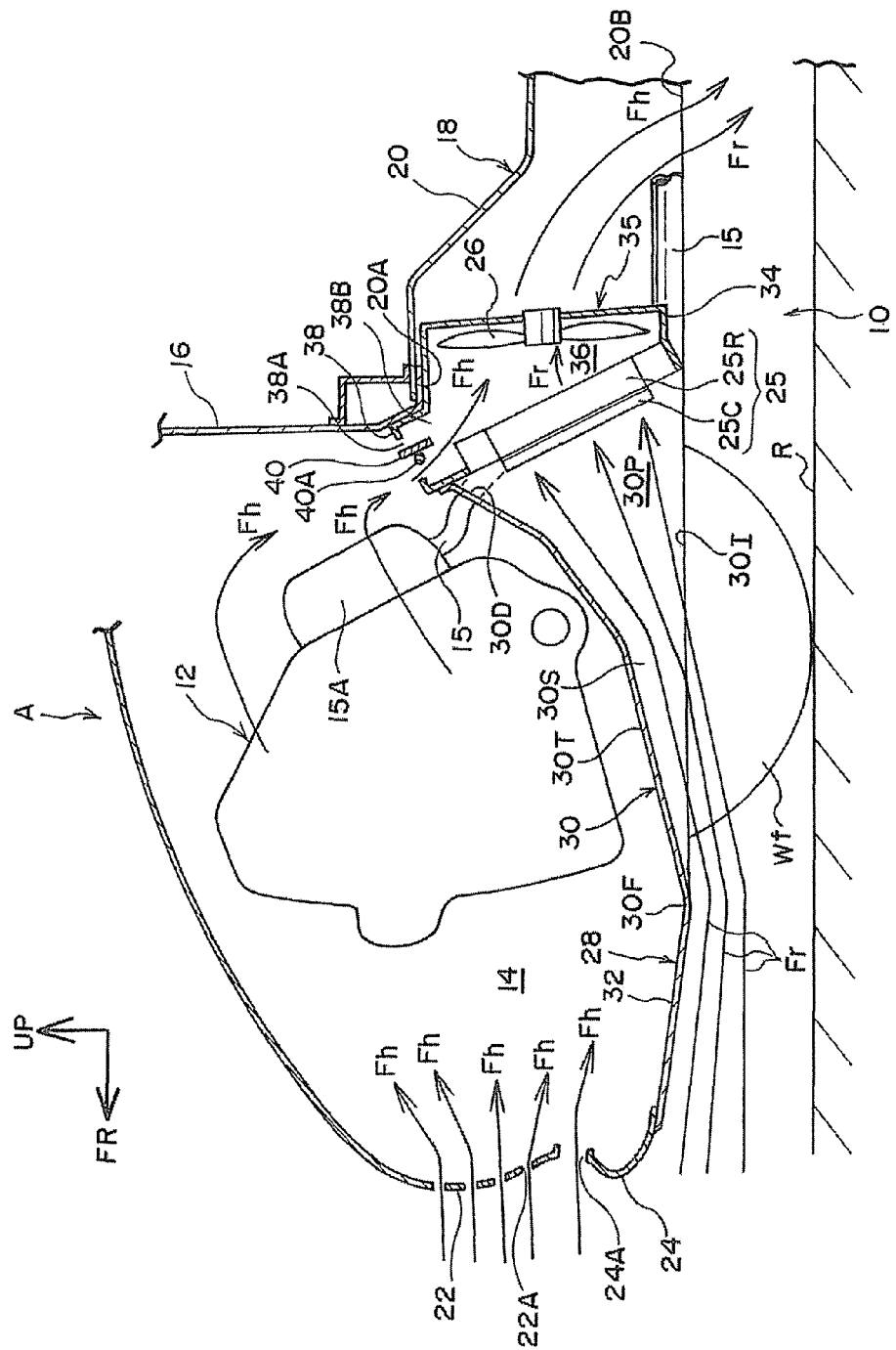
FIG. 2 is a side sectional view showing a fan operating state in the cooling structure for a vehicle relating to the embodiment of the present invention.
Figure 3:
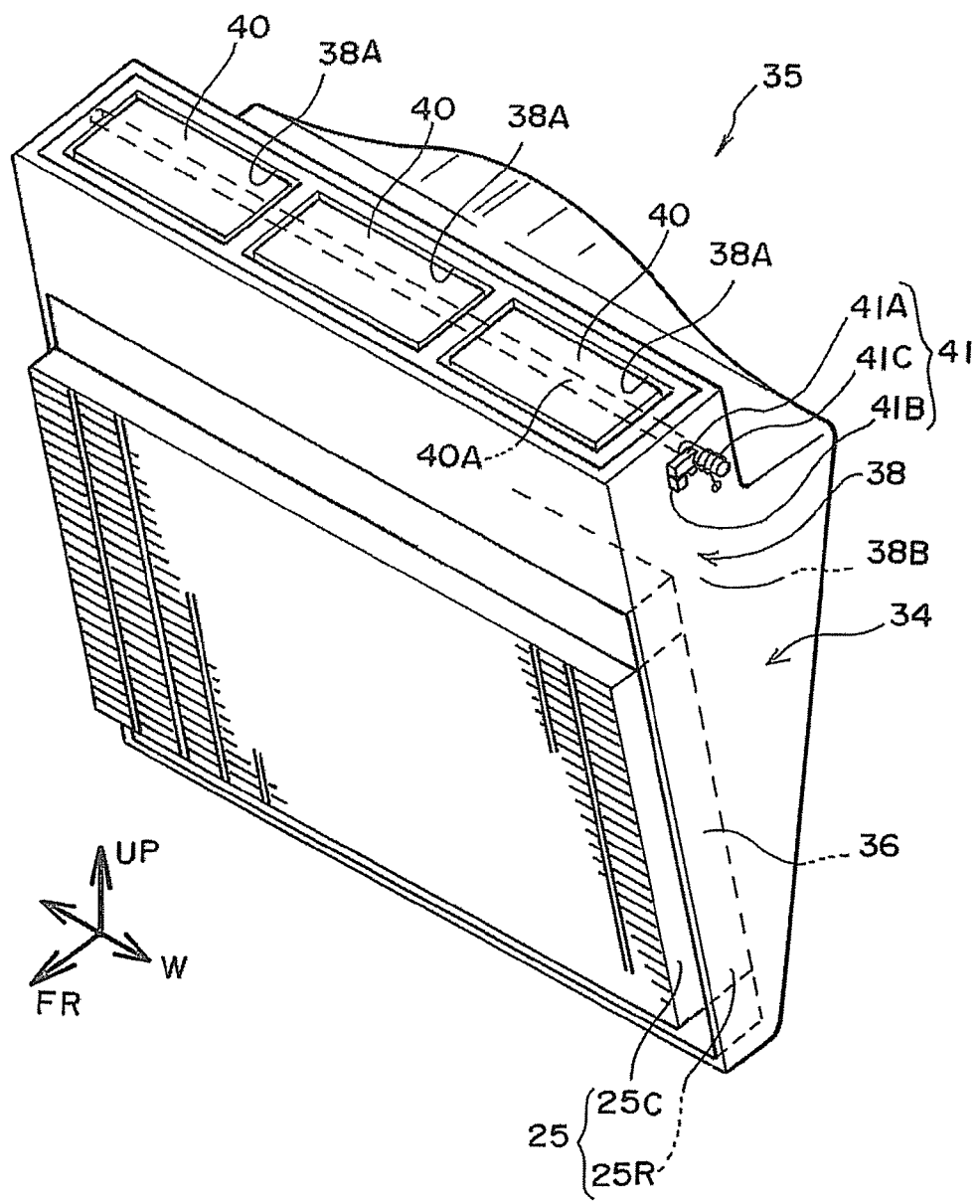
FIG. 3 is a perspective view seen from the front side of a cooling unit that structures the cooling structure for a vehicle relating to the embodiment of the present invention.

Concretely, the air-cooling-type heat exchanger 25 is disposed to be inclined (a forward incline) in side view such that the vehicle upper end side thereof is positioned further toward the vehicle front side than the lower end side. In side view, the fan 26 has a smaller angle of inclination than the air-cooling-type heat exchanger 25, or stands substantially upright. Due thereto, the aforementioned flow path 36, whose upper portion is wider than the lower portion, is formed between the air-cooling-type heat exchanger 25 and the fan 26. This cooling unit 35 is structured such that the air-cooling-type heat exchanger 25 is held at the shroud 34 so as to close-off the front side opening end of the shroud 34 as shown in FIG. 2, and such that the fan 26 is supported within the rear side opening portion of the shroud 34 as shown in FIG. 3.

Further, the cooling unit 35, in which the air-cooling-type heat exchanger 25, fan 26 and shroud 34 are made integral (are made into a sub-assembly), is disposed in a sealed state between the guide-out port 30D of the duct 30 and the front side opening end 20A of the floor tunnel 20. Due to the above, at the cooling structure 10 for a vehicle, the duct 30 (between the automobile A and the road surface R) and the floor tunnel 20 are communicated via the cooling unit 35 (the air side flow path of the air-cooling-type heat exchanger 25 that includes the flow path 36).

Note that the position of the lower end of the air-cooling-type heat exchanger 25, that is disposed to be inclined as described above, substantially coincides with the positions of the rear end of the introduction port 30I and the lower end of the guide-out port 30D. Due to this arrangement and the above-described Venturi wall 32, at (the air side flow path of) the air-cooling-type heat exchanger 25, an air flow is guided through the duct 30 accompanying the traveling of the automobile A. This embodiment is structured such that the cooling wind Fr, that is generated by the traveling wind, passes along a direction (see arrow FA shown in FIG. 1) that is substantially orthogonal to the front surface of the air-cooling-type heat exchanger 25. The cooling wind Fr is an air flow (second air flow) that goes through the introduction port 30I, the duct 30, the air-cooling-type heat exchanger 25, the flow path 36, and the floor tunnel 20 (the downwardly-facing opening end 20B). Further, at the cooling structure 10 for a vehicle, the cooling wind Fr is generated also by operation of the fan 26. Namely, there is a structure in which, due to the fan 26 operating, the cooling wind Fr is generated even when the automobile A is traveling at a low speed or is stopped.

Further, as shown in FIG. 1, the cooling structure 10 for a vehicle has a communication duct 38 that serves as a structure that communicates the rear portion of the power unit chamber 14 and the flow path 36 that is within the cooling unit 35. The communication duct 38 has first openings 38A, that open at the shroud 34 at the rear of the power unit 12 that is in the power unit chamber 14, and a second opening 38B, that opens at the upper end portion of the flow path 36. Namely, the communication duct 38 projects-out into the power unit chamber 14 from the upper end portion of the cooling unit 35 (between the guide-out port 30D and the front side opening end 20A), and the first openings 38A are formed in this projecting-out end. In this embodiment, the communication duct 38 is formed integrally with the shroud 34. The entire shroud 34, including the communication duct 38, is formed integrally by resin molding or the like.

As shown in FIG. 2, due to this communication duct 38, there is a structure in which an air flow Fh, that serves as a first air flow and that goes through the air intake ports 22A, 24A, the power unit chamber 14, the communication duct 38, the flow path 36 and the floor tunnel 20, can be generated. In this embodiment, due to the communication duct 38 communicating with the flow path 36 that is positioned at the upstream side of the fan 26, the air flow Fh is generated by operation of this fan 26. Note that, in the cooling structure 10 for a vehicle, the cooling wind Fr also is generated by operation of the fan 26 as described above.

Figure 4:
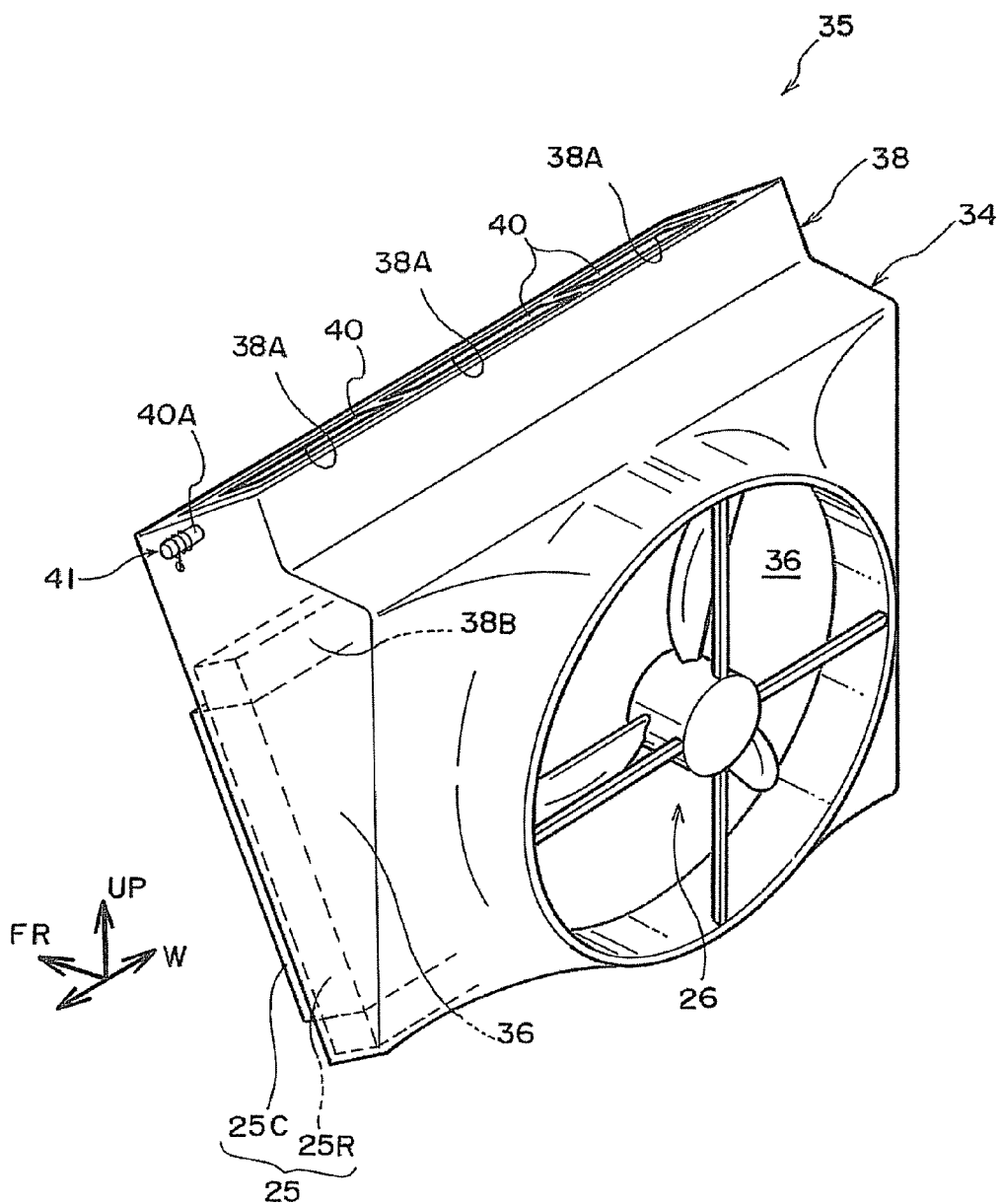
FIG. 4 is a perspective view seen from the rear side of the cooling unit that structures the cooling structure for a vehicle relating to the embodiment of the present invention.

As shown in FIG. 3 and FIG. 4, the above-described communication duct 38 is provided over substantially the entire width along the vehicle width direction of the cooling unit 35. The first openings 38A are divided into plural openings so as to be lined-up along the vehicle width direction. Each of the first openings 38A is formed, in plan view, in a substantial rectangular shape that is long in the vehicle width direction.

Moreover, the cooling structure 10 for a vehicle has flaps 40 that serve as closing members that can open and close the first openings 38A of the communication duct 38. The flaps 40 in this embodiment are structured so as to, by rotating around a shaft 40A that runs along the vehicle width direction, be able to be set in closing postures in which the flaps 40 close the first openings 38A and opening postures in which the flaps 40 open the first openings. The flaps 40 are structured so as to usually be set in the closing postures. The flaps 40 can be structured to maintain the closing postures by, for example, the flaps 40 being pushed against unillustrated stoppers by the urging force of an unillustrated spring or magnet. In this embodiment, as shown in FIG. 3, a closing structure 41 that holds the flaps 40 at the closing postures is formed by an anchor piece 41A that is provided at the shaft 40A, a stopper 41B that hits the anchor piece 41A and positions the flaps 40 at closed positions, and a torsion spring 41C that rotates and urges the shaft 40A in the direction in which the anchor piece 41A hits the stopper 41B.

Further, in the cooling structure 10 for a vehicle, the flaps 40 are switched to the opening postures against the urging force of the torsion spring 41C by aerodynamic force that is generated by operation of the fan 26. To supplementarily describe this point, the flaps 40 are moved to and are maintained at these opening postures due to the pressure difference between the power unit chamber 14 and the flow path 36 (the floor tunnel 20) that is generated by operation of the fan 26, or in other words, due to the air flow Fh that is generated by the aforementioned pressure difference.

Further, in the cooling structure 10 for a vehicle, the fan 26 is electrically connected to a cooling ECU 42 that serves as a control means. The cooling ECU 42 is structured so as to cause the fan 26 to operate at times of high load of the power unit 12, and stop the fan 26 at times of low load of the power unit 12. Concretely, on the basis of information from a water temperature meter 44 that detects the cooling water temperature, the cooling ECU 42 causes the fan 26 to operate when the cooling water temperature exceeds a first threshold value, and stops the fan 26 when the cooling water temperature is below a second threshold value that is less than or equal to the first threshold value. In other words, this control can be interpreted as control that causes the fan 26 to operate when the load (heat generation), with respect to the cooling capacity in a state in which the fan 26 is not operated, is high.

Operation of the embodiment is described next.

In the automobile A to which the cooling structure 10 for a vehicle of the above-described structure is applied, when the cooling water temperature detected by the water temperature meter 44 does not exceed the first threshold value, the cooling ECU 42 maintains the stopped state of the fan 26. At such times of low-load-state operation of the power unit 12, a portion of the traveling wind that accompanies traveling of the automobile is made to be the cooling wind Fr as shown in FIG. 1. Namely, a portion of the traveling wind is introduced from the introduction port 30I into the duct 30, and the traveling wind Fr, that goes through the duct 30, the air-cooling-type heat exchanger 25, the flow path 36, the fan 26, and the floor tunnel 20, is generated. At this time, introduction of traveling wind into the duct 30 is promoted by the Venturi effect of the Venturi wall 32 (the flow rate of the cooling wind Fr increases as compared with a case in which there is no Venturi wall 32).

Due thereto, the cooling water, that circulates between the power unit 12 and the radiator 25R of the air-cooling-type heat exchanger 25, is cooled by heat exchange with air at the air-cooling-type heat exchanger 25. Additionally, when the air conditioner is being operated, refrigerant circulates in the order of the condenser 25C of the air-cooling-type heat exchanger 25, the expansion valve, the evaporator and the compressor whereby a refrigeration cycle is formed, and the condenser portion of the air-cooling-type heat exchanger 25 achieves the function of cooling and condensing the refrigerant by heat exchange with air.

When the cooling water temperature detected by the water temperature meter 44 exceeds the first threshold value, the cooling ECU 42 causes the fan 26 to operate. Thus, the air flow, that is introduced-in from the introduction port 30I due to the pressure difference at the front and rear of the fan 26, is made to be the cooling wind Fr. Therefore, a sufficient air volume of the cooling wind Fr is ensured even when the traveling speed of the automobile A is low.

Further, due to the pressure difference that arises accompanying operation of the fan 26, the postures of the flaps 40 are changed from the closing postures to the opening postures. Thus, the air (hereinafter called hot air) within the power unit chamber 14 that has been heated by the high-load power unit 12 is drawn-out from the power unit chamber 14. In addition, air of the exterior of the vehicle (hereinafter called fresh air) is introduced into the power unit chamber 14 through the air intake ports 22A, 24A.

Here, in the cooling structure 10 for a vehicle, a heat exchanger such as a radiator or the like is not disposed in front of the power unit 12 within the power unit chamber 14. Therefore, the fresh air is introduced into the power unit chamber 14 while being cool as is, and without being heated by a radiator or the like. Further, the hot air, that has been heated by the power unit 12 and the exhaust pipe 15 (the exhaust manifold 15A), is forcibly discharged from the rear portion of the power unit chamber 14 interior due to operation of the fan 26. Due thereto, at times of high-load operation of the power unit 12, the atmosphere temperature within the power unit chamber 14 can be kept low.

For example, in a comparative example in which a radiator or the like is disposed in front of the power unit, air heated by this radiator is made to flow to the power unit side, and the air is further heated by the power unit and the exhaust pipe 15 (the exhaust manifold 15A). Therefore, in the comparative example, the interior of the power unit chamber becomes extremely high temperature, and countermeasures for withstanding high temperatures (countermeasures to thermal damage for the lifespan and the like) are needed for the parts within the power unit chamber 14.

In contrast, in the cooling structure 10 for a vehicle, the atmosphere temperature within the power unit chamber 14 can be kept low as described above, and therefore, countermeasures to thermal damage for parts (parts other than the power unit 12) that are disposed within the power unit chamber 14 can be rendered unnecessary or made to be simple. Namely, the setting of a heat insulator or the like that covers the respective parts can be omitted, and materials having low heat-resistant temperatures can be selected. These contribute to a reduction in cost of the automobile A to which the cooling structure 10 for a vehicle is applied.

Further, in the cooling structure 10 for a vehicle, because fresh air is introduced into the power unit chamber 14 as described above, the cooling efficiency of the power unit 12 improves. Namely, in the above-described comparative example, because air that has been heated by the radiator flows to the power unit 12 side, the cooling effect of the power unit 12 by this air is weak. In contrast, in the cooling structure 10 for a vehicle, the air that is introduced-in from the air intake ports 22A, 24A flows to the power unit 12 side while being cool as is, and therefore, the cooling effect of the power unit 12 by this air is strong as compared with the above-described comparative example.

Concretely, in contrast with cooling the power unit within the high-temperature power unit chamber in the comparative example, in the cooling structure 10 for a vehicle, the power unit 12 is cooled by using the air-cooling-type heat exchanger 25 that is disposed at the outer side of the power unit chamber 14, while air-cooling the power unit 12 by fresh air, and therefore, the cooling efficiency of the power unit 12 is high. Due thereto, in the cooling structure 10 for a vehicle, as compared with the comparative example, a sufficient cooling performance can be obtained at the air-cooling-type heat exchanger 25 that is compact, or, as compared with the comparative example, the operation time of the fan 26 is made to be short and consumed energy can be decreased.

Moreover, in the cooling structure 10 for a vehicle, due to the communication duct 38, the air flow Fh from the power unit chamber 14 merges with the flow path 36 that is between the air-cooling-type heat exchanger 25 and the fan 26. Therefore, the hot air from the power unit chamber 14 affecting the cooling performance of the air-cooling-type heat exchanger 25 is prevented or effectively suppressed.

Still further, in the cooling structure 10 for a vehicle, when there is no need to generate the air flow Fh, the first openings 38A of the communication duct 38 are closed. Therefore, for example, during warming-up of the power unit 12 or the like, the heat, that should be supplied for the warming-up of the interior of the power unit chamber 14, being expelled out together with air is suppressed or prevented. Due thereto, the heat within the power unit chamber 14 is utilized effectively, and warming-up of the power unit 12 is promoted. Further, due to the flaps 40 that close the first openings 38A, a flow adjusting effect (an effect of suppressing generation of swirls) of the cooling wind Fr is obtained, and entry (reverse flow) of traveling wind into the power unit chamber 14, and the like, is prevented or effectively suppressed.

Further, in the cooling structure 10 for a vehicle, the flaps 40 move from the closing postures to the opening postures due to operation of the fan 26. Therefore, by a simple structure, effects such as the above-described promotion of warming-up, flow adjustment, prevention of reverse flow into the power unit chamber 14, and the like can be obtained.

Note that the above-described embodiment illustrates an example in which the first openings 38A are opened and closed by the flaps 40, but the present invention is not limited to this, and various modifications are possible. For example, there may be a structure in which members that close the first openings 38A are not provided. Further, for example, instead of the flaps 40, there may be a structure in which check valves, that permit only air flow from the power unit chamber 14 side toward the flow path 36, are provided. Moreover, for example, instead of the flaps 40, there may be a structure in which valve members, that are formed from a rubber material or the like and that switch postures of opening/closing the first openings 38A due to their own elastic deformation, are provided. Still further, for example, instead of the flaps 40 that are switched to the opening postures by operation of the fan 26, there may be a structure in which flaps, that switch between closing postures and opening postures by an actuator, are provided.

Moreover, although the above-described embodiment illustrates an example in which the communication duct 38 is formed integrally with the shroud 34, the present invention is not limited to this and various modifications are possible. For example, the communication duct 38 may be structured as a body separate from the shroud 34. Further, for example, there may be a structure that does not have the shroud 34. Namely, there may be a structure in which the air-cooling-type heat exchanger 25 and the fan 26 are assembled separately to the vehicle body.

Moreover, although the above-described embodiment illustrates an example in which the air intake ports 22A, 24A for taking air into the power unit chamber 14 are provided at the grill 22 and the front bumper 24 (the bumper cover), the present invention is not limited to this, and various modifications are possible. For example, air intake ports that face the road surface side may be provided in front of the power unit 12 at the under cover 28. Further, for example, there may be a structure in which air intake ports, that are usually closed by shutters or the like and that are opened when the fan 26 operates, are provided.

Still further, although the above-described embodiment illustrates an example in which the Venturi wall 32 is formed at the front of the duct 30, the present invention is not limited to this, and various modifications are possible. For example, the under cover 28 at the front of the duct 30 may be formed to be flat (substantially parallel to the road surface R). Moreover, for example, together with the Venturi wall 32 or instead of the Venturi wall 32, an aerodynamic structure that causes a portion of the traveling wind to flow into the duct 30 as the cooling wind Fr may be provided. For example, a wind guiding member, such as spats or the like that projects-out beneath the floor from the lower end of the air-cooling-type heat exchanger 25, can be provided as such an aerodynamic structure. Further, this wind guiding member may be made to be, for example, a member whose shape or posture is changed in accordance with the vehicle speed.

Further, the above-described embodiment illustrates an example in which the power unit 12, that includes an internal combustion engine and a motor, is disposed in the power unit chamber 14 that is positioned in front of the vehicle cabin C, but the present invention is not limited to this, and various modifications are possible. For example, there may be a structure in which the power unit 12 does not include a motor (a general engine vehicle such as a front-wheel drive vehicle, a rear-wheel drive vehicle, a four-wheel drive vehicle, or the like).

Moreover, the above-described embodiment illustrates an example in which the power unit 12 is structured to include an electric motor and an unillustrated generator, power dividing mechanism, transmission that is a continuously variable transmission, and the like. However, the present invention is not limited to this, and various modifications are possible. For example, a usual transaxle of, for example, a manual transmission (MT), a torque converter type or the like automatic transmission (AT), a continuously variable transmission (CVT) or the like, may be used as the transaxle that structures the power unit 12. These transaxles can also be interpreted as structures that are not included in the power unit 12 (the power unit can be interpreted as a unit that is structured with the main portion thereof being a drive source such as an engine or the like).

In addition, the present invention is not limited to the structure of the above-described embodiment, and it goes without saying that the present invention can be implemented by being modified in various ways within a scope that does not deviate from the gist thereof.

The invention claimed is:

1. A cooling structure for a vehicle, comprising:
   a power unit that is disposed within a power unit chamber that is disposed at a front side in a front-rear direction of a vehicle and at which air intake ports are formed at a front end side in the vehicle front-rear direction, the power unit generating driving force for the vehicle to travel;
   a body to be cooled that is disposed at a rear side in the vehicle front-rear direction with respect to the power unit, and that is cooled by heat exchange with air;
   a fan that is disposed at a rear side in the vehicle front-rear direction from the body to be cooled, and that, by operating, generates a flow of air that passes through from a front side toward a rear side of the body to be cooled in the vehicle front-rear direction; and
   a communication structure that communicates a space in the vehicle front-rear direction between the fan and the body to be cooled, and a rear side portion in the vehicle front-rear direction from the power unit in the power unit chamber,
   wherein the body to be cooled is disposed to be inclined in side view such that a vehicle upper end side thereof is positioned further toward the vehicle front side than a lower end side thereof, and an upper portion is wider than a lower portion in the space between the fan and the body to be cooled.

2. The cooling structure for a vehicle of claim 1, further comprising:
   an under cover that covers the power unit chamber from a road surface side, and that has an opening portion that opens to the road surface side at a front side in the vehicle front-rear direction from the body to be cooled; and
   a duct that covers, from the power unit chamber side, a flow path of air that is guided from the opening portion to the body to be cooled.

3. The cooling structure for a vehicle of claim 1, further comprising a closing member that closes the communication structure when the fan is not operating.

4. The cooling structure for a vehicle of claim 3, wherein the closing member is structured so as to be held at a closing position of the communication structure by a closing structure at times of non-operation of the fan, and so as to, accompanying operation of the fan, be moved by aerodynamic force from the closing position to an opening position of the communication structure.

5. The cooling structure for a vehicle of claim 1, wherein the communication structure is provided integrally with a shroud to which the body to be cooled and the fan are assembled and that covers the space between the body to be cooled and the fan.

6. The cooling structure for a vehicle of claim 1, wherein the body to be cooled is structured to include a radiator that, by heat exchange with air, cools a refrigerant that circulates between the radiator and the power unit.

7. The cooling structure for a vehicle of claim 1, wherein the communication structure is configured such that air which has passed the power unit chamber can flow toward a rear side of the body to be cooled.

* * * * *